May 2, 1933. H. LEDWINKA 1,906,930
ELECTRICALLY DRIVEN AUTOMOBILE VEHICLE
Filed Nov. 7, 1929
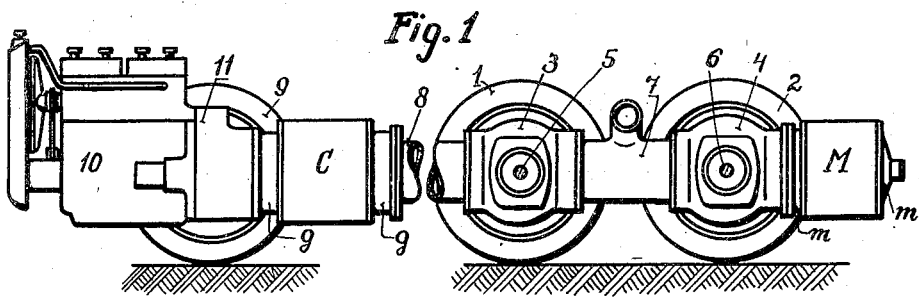
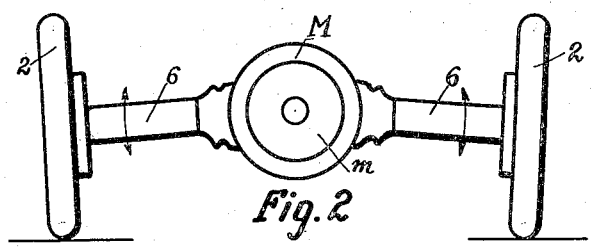
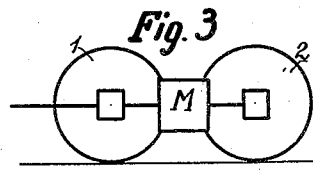
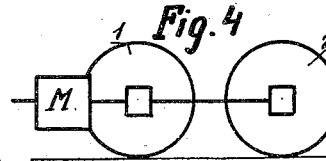
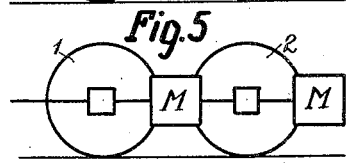
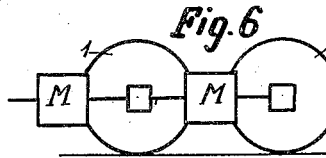
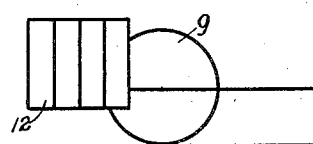
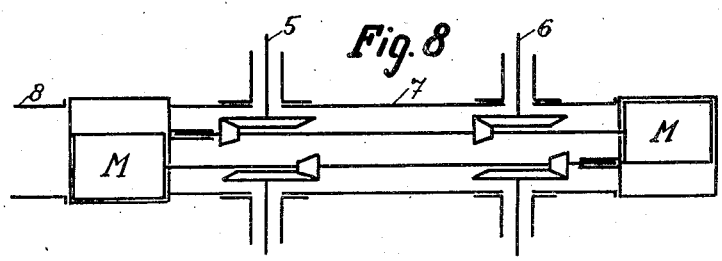
H. Ledwinka
INVENTOR
By Marks & Clerk
Attys.

Patented May 2, 1933

1,906,930

UNITED STATES PATENT OFFICE

HANS LEDWINKA, OF KOPRIVNICE, CZECHOSLOVAKIA

ELECTRICALLY DRIVEN AUTOMOBILE VEHICLE

Application filed November 7, 1929, Serial No. 405,519, and in Germany December 31, 1928.

This invention relates to electrically driven automobile vehicles, in which a tubular hollow body arranged in the centre line of the car forms the underframe of the vehicle, on which the driving wheels are so arranged as to be movable up and down.

The invention relates more particularly to those vehicles of the kind hereinbefore indicated, in which the current serving for feeding the motor is supplied by a generator, which in its turn is driven by an internal-combustion engine or the like.

The invention consists in the fact that the motor casing or the generator casing forms a part of a continuation of the tubular underframe.

In power-driven vehicles with a plurality of driving axles there may be employed according to the present invention one motor for each axle, each of the motors forming a part or a continuation of the tubular underframe. This arrangement has the advantage, as compared with the employment of only one motor, that automatic compensation between the two live axles can be effected without employing a differential.

The invention is illustrated by way of example in the accompanying drawing in which Fig. 1 is a fragmentary side elevation; Fig. 2 a rear elevation of the under frame; while Figs. 3, 4, 5 and 6 show diagrammatical side views of modified forms of the invention.

Fig. 7 is a similar side view of another modification using accumulators instead of internal combustion engine for feeding the electric motors, and Fig. 8 a diagrammatic plan view showing the drive wheels on the same side coupled together.

Two pairs of driving wheels 1 and 2 are supported in a manner known in the art on half-axles, which are rockably pivoted to differential casings 3 and 4. The driving of the wheels 1 and 2 is effected by means of shafts 5 and 6 journalled in the half-axles. The differential casings 3 and 4, in a manner known in the art, form part of a tubular underframe, the main portion of which consists of preferably seamlessly drawn tubes 7 and 8.

The casing of an electric motor M serving for driving the wheels 1 and 2, in the constructional example illustrated, is overhung on the rear portion of the rear differential casing 4, being secured preferably by means of flanges, and forms a continuation of the tubular underframe. For transmitting the motion from the motor to the front driving wheels 1 there serves a shaft journalled in a manner known in the art in the tube 7.

The motor might alternatively be arranged between the middle pair of wheels 1 and the rear pair of wheels 2, see Fig. 3, or between the middle pair of wheels 1 and the steering wheels 9 in front, see Fig. 4. In these cases also the motor casing would form part of the tubular supporting body 7, 8.

Furthermore a separate motor might be provided for each of the two pairs of wheels 1 and 2, see Fig. 5, the transmission shaft journalled in the tubular member 7 being omitted. In this case one of the motors would preferably be arranged behind the rear axle in the manner illustrated in Fig. 1, while the other would be arranged preferably between the two pairs of wheels 1 and 2, as in Fig. 5, or else one motor between the pairs of wheels 1 and 9 and the others between the two pairs of wheels 1 and 2, as in Fig. 6.

The current serving for feeding the electric motor is preferably generated by a generator G, the casing of which likewise forms part of the tubular underframe. The generator G is driven by an internal-combustion engine 10 or the like, which is secured in an overhung position to the front portion 11 of the tubular underframe in a manner known in the art. If required, a transmission gear may be inserted in the casing part 11 between the engine 10 and the generator G. If no transmission gear is required, the internal-combustion engine 10 may be secured directly to the front flange of the generator G.

Instead of the internal-combustion engine 10 and the generator G, a battery of accumulators 12 might be employed for feeding the electric motor M, see Fig. 7, and would preferably be arranged in a readily exchangeable manner at the place occupied by the internal-combustion engine 10 in the constructional example illustrated in Fig. 1. The rotor, the motor M and the generator G may be supported in covers $m$, $m$ and $g$, $g$ connected with the ends of the casings, and likewise forming part of the tubular supporting body, or the covers in which the rotors are supported may be connected directly to the other parts of the tubular supporting body in the interior of the casings of the motor and of the generator respectively.

Another important advantage of the new construction consists in the fact that by means of the invention vehicles with tubular central supporting bodies and driving wheels movable up and down, see Fig. 2, relatively to the supporting bodies which are already under construction or in use, can be converted in a simple manner to electrical drive or to electrical power transmission.

It is only necessary to replace the change-speed gear by the generator and to introduce the electric motor at a suitable position. The electric motor will preferably be arranged at the position shown in the constructional example illustrated, which was occupied in the earlier arrangements by the gear brake.

Of course the invention can also be employed for vehicles with only four wheels.

In practice it has been, till now, in most frequent cases necessary to give up a compensation between the two driving axles by means of a third differential, as otherwise, when only one of the four driving wheels slides, the remaining three wheels stop.

By the use of an electric motor for each driving wheel or for two or more driving wheels arranged on the one side of the vehicle, the use of any differential may be entirely suspended. It has been found that it is possible, in vehicles having four driving wheels lying close together to arrange for the purpose of travelling a curve, compensating means only between the two driving wheels lying on the one side of the vehicle, and similar compensating means for the two driving wheels lying on the other side of the vehicle. This is illustrated in Fig. 8 where the driving wheels on the left side are interconnected by shafts and gears actuated by the forward motor M, while the gears on the right side are similarly connected with the rear motor M and run independently of the left side wheels. In this art of construction, the shafts of the two motors may be arranged without any difficulty closely by each other.

The rockable front axles may be pivoted to any or two or all of the following parts: to the casing part 11, to the generator G or to the cover $g$ of the generator.

What I claim is:—

1. In an electrically driven automobile vehicle, a tubular hollow body arranged in the centre of the vehicle and forming the underframe, driving wheels, means for mounting the driving wheels on the underframe so as to be movable up and down, an electric motor for driving the vehicle, a casing for the motor forming a continuation of the tubular underframe, a generator supplying power to the electric motor, an internal combustion engine adapted to drive the generator, and a casing for the generator forming the front portion of the tubular underframe and adapted to carry the internal combustion engine in an overhung position.

2. In an electrically driven automobile vehicle, a tubular hollow body arranged in the centre of the vehicle and forming the underframe, a plurality of pairs of driving wheels, means for mounting the driving wheels on the underframe so as to be movable up and down, a separate electric motor for each pair of driving wheels and casings for the motors forming continuations of the tubular underframe.

3. In an electrically driven automobile vehicle, a tubular hollow body arranged in the centre of the vehicle and forming the underframe, a plurality of pairs of driving wheels, means for mounting the driving wheels on the underframe so as to be movable up and down, separate electric motors for the driving wheels located on different sides of the vehicle and casings for the motors forming continuations of the tubular underframe.

4. In an electrically driven automobile vehicle, a tubular hollow body arranged in the centre of the vehicle and forming the underframe, a plurality of pairs of driving wheels, means for mounting the driving wheels on the underframe so as to be movable up and down, separate driving shafts for the driving wheels located on different sides of the vehicle, a separate electric motor for each driving shaft, and casings for the motors forming continuations of the tubular underframe.

5. In an electrically driven automobile vehicle, a tubular hollow body arranged in the centre of the vehicle and forming the underframe, a plurality of pairs of driving wheels, means for mounting the driving wheels on the underframe so as to be movable up and down, separate driving shafts for the driving wheels located on different sides of the vehicle, a separate electric motor for each driving shaft, the motor for the driving wheels on one side of the vehicle being arranged in front of the axle of these driving wheels, while the motor for the driving wheels on the other side of the vehicle is arranged behind the axle of these driving wheels, and casings for the motors forming continuations of the tubular underframe.

6. In an electrically driven automobile vehicle, a tubular hollow body arranged in the centre of the vehicle and forming the underframe, a plurality of pairs of driving wheels, means for mounting the driving wheels on the underframe so as to be movable up and down, an electric motor for driving the vehicle located behind the driving wheels, a generator supplying power to the electric motor, in internal combustion engine adapted to drive the generator, a casing for the generator forming the front portion of the tubular underframe and adapted to carry the internal combustion engine in an overhung position, and a casing for the electric motor forming a rearward continuation of the tubular underframe.

7. In an electrically driven automobile vehicle, a tubular hollow body arranged in the centre of the vehicle and forming the underframe, two pairs of driving wheels, an electric motor for driving the vehicle disposed between the pairs of driving wheels, a generator supplying power to the electric motor, an internal combustion engine adapted to drive the generator, a casing for the generator forming the front portion of the tubular underframe and adapted to carry the internal combustion engine in an overhung position, and a casing for the motor forming a part of the tubular underframe.

In testimony whereof I have signed my name to this specification.

HANS LEDWINKA.